(12) United States Patent
Choi et al.

(10) Patent No.: US 10,057,067 B2
(45) Date of Patent: Aug. 21, 2018

(54) AUTOMATIC ROOT KEY ROLLOVER DURING DIGITAL SIGNATURE VERIFICATION

(71) Applicant: International Business Machines Corporation, Armonk, NY (US)

(72) Inventors: Wai F. Choi, Poughkeepsie, NY (US); James W. Sweeny, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 14/722,726

(22) Filed: May 27, 2015

(65) Prior Publication Data
US 2016/0352521 A1 Dec. 1, 2016

(51) Int. Cl.
*H04L 9/32* (2006.01)
*H04L 9/00* (2006.01)

(52) U.S. Cl.
CPC ............ *H04L 9/3247* (2013.01); *H04L 9/007* (2013.01); *H04L 9/3268* (2013.01)

(58) Field of Classification Search
CPC .......... H04L 9/32–9/3297; H04L 9/007; H04L 9/00; H04L 9/006; H04L 9/0825
USPC ............. 713/155–157, 175; 380/273; 726/10
See application file for complete search history.

(56) References Cited

U.S. PATENT DOCUMENTS

| | | | |
|---|---|---|---|
| 5,857,022 A * | 1/1999 | Sudia | G06Q 20/02 380/277 |
| 6,615,347 B1 | 9/2003 | de Silva et al. | |
| 8,135,951 B2 | 3/2012 | Adams et al. | |
| 2003/0014629 A1* | 1/2003 | Zuccherato | H04L 9/3268 713/156 |
| 2004/0148505 A1* | 7/2004 | Qiu | G06F 21/33 713/175 |
| 2006/0085633 A1* | 4/2006 | Balfanz | G06Q 20/02 713/155 |
| 2011/0087882 A1 | 4/2011 | Kuo et al. | |
| 2013/0013918 A1 | 1/2013 | Brown et al. | |

OTHER PUBLICATIONS

Apple et al., "About Code Signing", Copyright © 2012 Apple Inc., pp. 1-2, <https://developer.apple.com/library/mac/#documentation/Security/Conceptual/CodeSigningGuide/Introduction/Introduction.html>.

(Continued)

*Primary Examiner* — Ashok Patel
*Assistant Examiner* — Quazi Farooqui
(74) *Attorney, Agent, or Firm* — Gilbert Harmon, Jr.

(57) ABSTRACT

A method for verifying digital signatures in the presence of root key rollover includes issuing a cross-certificate to a rekeyed root certificate, validating the cross-certificate and the rekeyed root certificate with respect to an original trusted root certificate, and validating a digital media signature using the cross-certificate and the rekeyed root certificate. The method may also include adding the rekeyed root certificate to an end user's trusted root certificate store. The digital media signature validated via the method may correspond to a program signature. Validating the cross-certificate and the rekeyed root certificate may include verifying certificates within a program's certificate chain. A computer program product and a computer system corresponding to the method are also disclosed.

14 Claims, 8 Drawing Sheets

(56) References Cited

OTHER PUBLICATIONS

Huston et al., "Certification Authority (CA) Key Rollover in the Resource Public Key Infrastructure (RPKI) (RFC6489)", An IP.com Prior Art Database Technical Disclosure, Original Publication Date: Feb. 1, 2012, IP.com No. IPCOM000214749D, IP.com Electronic Publication: Feb. 5, 2012, pp. 1-10.

Microsoft et al., "Introduction to Code Signing", © 2015 Microsoft, pp. 1-3, <http://msdn.microsoft.com/en-us/library/ms537361.aspx>.

Wikipedia et al, "Code signing", This page was last modified on Feb. 26, 2015, at 10:59, pp. 1-4, Wikipedia® is a registered trademark of the Wikimedia Foundation, Inc., <http://en.wikipedia.org/wiki/Code_signing>.

* cited by examiner

AUTOMATIC ROOT KEY ROLLOVER DURING DIGITAL SIGNATURE VERIFICATION

BACKGROUND OF THE INVENTION

The present invention relates generally to the field of digital media signing, and more specifically to verifying digital signatures.

It is common today for application developers to digitally sign the programs they are developing. This practice is known as code signing. Programs that are signed undergo signature verification before being executed by the end-user computing system. The signature verification process enables customers using such a program to be assured that the program has not been altered at a subsequent point after being developed. In other words, the signature verification process ensures that the program is genuine. Programs are only one example of digital media that can be signed and consequentially may require digital signature verification. Media in this context can be any digital data including, but not limited to, audio and video files, legal documents and contracts, and binary program code.

Programs are signed using a signing key-pair. The private half of said key-pair is used to apply the digital signature to the program. The public half, also called the public key, is disseminated with the program to enable the signature to be verified. The code signing (verification) public key is packaged inside a digital certificate. This digital certificate is issued by a certificate authority (CA) and is itself signed by the CA's own signing key-pair. The CA signing public key is packaged inside a different digital certificate that is either issued by another CA or is self-signed. Self-signed certificates are called root certificates, and non-self-signed certificates are called either intermediate certificates or subordinate certificates. Hence, for any code verification public key, there exists a certificate chain, with zero or more subordinate certificates, that connects the verification public key to a root CA. Thus, if the root CA is a known certificate authority that is trusted by the end user, the code verification public key may also be trusted by verifying the signatures on the certificate chain.

SUMMARY

As disclosed herein, a method for verifying digital signatures in the presence of root key rollover includes issuing a cross-certificate to a rekeyed root certificate, validating the cross-certificate and the rekeyed root certificate with respect to an original trusted root certificate, and validating a digital media signature using the cross-certificate and the rekeyed root certificate. The method may also include adding the rekeyed root certificate to an end user's trusted root certificate store. The digital media signature validated via the method may correspond to a program signature. Validating the cross-certificate and the rekeyed root certificate may include verifying certificates within a program's certificate chain. A computer program product and a computer system corresponding to the method are also disclosed.

DETAILED DESCRIPTION

Certificates issued by a certificate authority have a finite lifetime, as indicated by the validity dates recorded in the certificates themselves. The key in a certificate that has expired should not be used to verify signatures as it is no longer trustworthy. The process of obtaining a new key-pair when the current one expires is known as key-rollover. The key-rollover process for a non-self-signed certificate requires generating a new key-pair and having the issuing CA reissue a new certificate with the new public key. This new certificate can be part of a modified certificate chain to be placed inside the next signed program created by the application developer. The verification process for the new program is exactly the same as the old except that different non-self-signed certificates are used. These are implicitly trusted because they emanate from the same trusted root CA.

The key-rollover process for a root CA requires generating a new key-pair and creating a new self-signed certificate. This part is simple enough, but from here the process is much more difficult. Under the current state of the art, the end-user must perform the same prerequisite administrative step of acquiring the new certificate and explicitly trusting it before it can be used to verify a signed program. In the desktop/mobile device realm, a common way to avoid this administrative step is to embed a set of well-known commercial CA root certificates into the operating system itself, which are trusted by default. In essence, these commercial CA root certificates are pushed to the end-user with each operating system software update. So, any roll-over certificates would also arrive this way. The main problem with this method is that "trusted by default" is not an acceptable security practice in most enterprise computing environments. Additionally, this technique does not work for organizations that choose to act as their own root certificate authority.

Implementation of embodiments of the invention may take a variety of forms, and exemplary implementation details are discussed subsequently with reference to the Figures. Additionally, while some embodiments disclosed correspond directly to code signing and program signature validation, it should be noted that the method can be used to validate any kind of signed digital media. This disclosure uses digital signatures applied to program code for illustrative purposes only and does not imply that this disclosure is limited to only signed program code. The present invention will now be described in detail with reference to the Figures.

Figure 1:
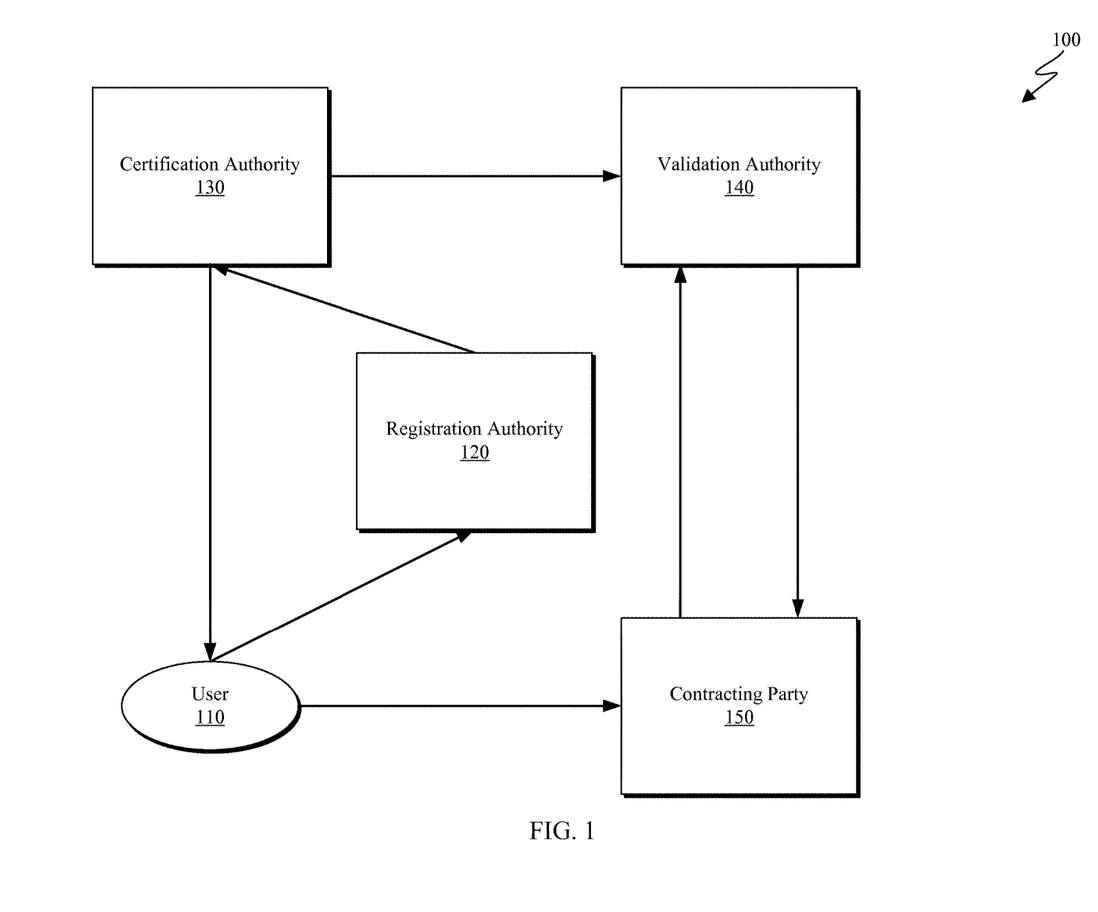
FIG. 1 is a functional block diagram depicting a signature verification system in accordance with some embodiments of the present invention.

FIG. 1 is a functional block diagram depicting a signature verification system 100 in accordance with some embodiments of the present invention. As depicted, signature verification environment 100 includes a user 110, a registration authority (RA) 120, a certification authority (CA) 130, a validation authority (VA) 140, and a contracting party 150. Signature verification system 100 is an example of an environment in which code signing may be present and signature verification may therefore be utilized.

User 110 may be an individual seeking to digitally sign a program or code he/she has written, or a contract. In some embodiments, user 110 applies for a certificate with his/her public key at a registration authority (RA) 120. In some embodiments, applying for a certificate may be an automated process executed by a computing system such as the one depicted in FIG. 5.

Registration authority (RA) 120 may be configured to maintain lists of codes under international standards. In some embodiments, registration authority 120 may also be configured to issue new codes to those wishing to register them. In the depicted embodiment, registration authority 120 is configured to verify the identity of user 110 and issue a new code corresponding to the user 110 to the certification authority 130. In some other embodiments, the user 110 is able to request a certificate from certification authority 130 directly.

Certification authority (CA) 130 may be configured to issue digital certificates certifying the ownership of a public key by the named subject of the certificate. In the depicted embodiment, certificate authority 130 receives verification of user 110's identity from the registration authority 120 and issues a certificate to the user. In some embodiments, certification authority 130 also sends the certificate corresponding to the user to validation authority 140.

Validation authority (VA) 140 may be configured to receive information about issued certificates from certification authority 130. When user 110 uses his/her certificate to digitally sign something (a contract, a program, etc.), validation authority 140 verifies the user's identity before the signature is validated. Validation authority 140 may send a certificate of approval to contracting party 150 if the user's identity is verified and the signature is therefore deemed valid.

A contracting party 150 may be an entity that requires a signature be verified. In some embodiments, contracting party 150 may be a user who has purchased or received a program and wishes to verify the program's validity. In other embodiments, contracting party 150 may be a shopping platform that requires a user to digitally sign a contract, and requires that the user signature on said contract be verified. In some embodiments, contracting party 150 corresponds to an end-user computing system. In said embodiments, the end-user computing system may include a trusted root certificate store configured to store root certificates that are trusted by the end-user.

Figure 2:
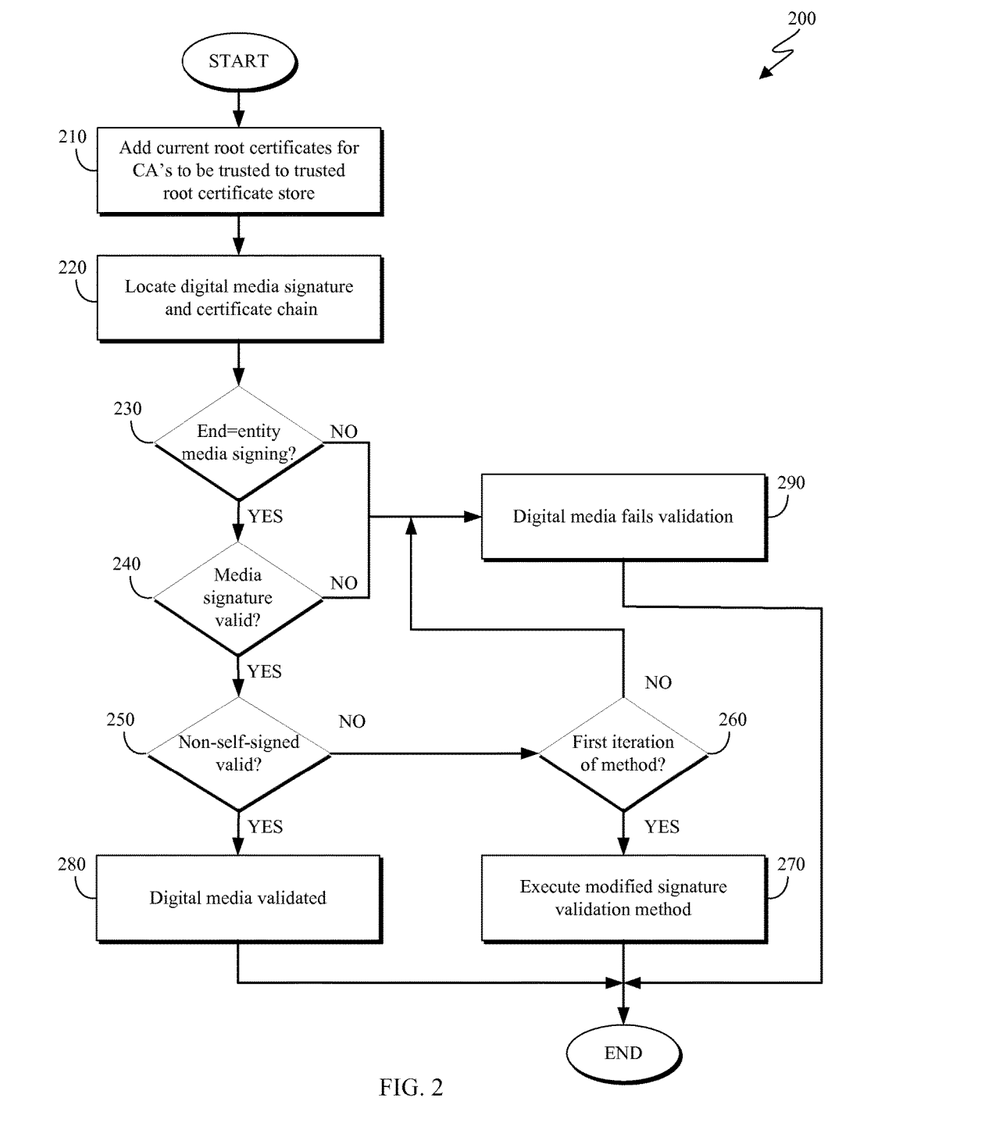
FIG. 2 is a flowchart depicting a signature verification method in accordance with some embodiments of the present invention.

FIG. 2 is a flowchart depicting a signature verification method 200 in accordance with some embodiments of the present invention. As depicted, signature verification method 200 includes adding (210) current root certificates for certification authorities to be trusted to a trusted root certificate store, locating (220) a program signature and a certificate chain corresponding to a program of interest, determining (230) if the end-entity certificate is a code signing certificate, determining (240) if the program signature is valid, determining (250) if each non-self-signed certificate in the chain has a verified signature, and executing (270) a rekeyed signature verification method. Signature verification method 200 may be used to determine whether or not a program is genuine.

Adding (210) current root certificates for certification authorities to be trusted to a trusted root certificate store may include identifying certification authorities that have been designated to be trusted. The current root certificates corresponding to these certification authorities may then be added to the trusted root certificate store. The trusted root certificate store may be a form of persistent storage configured to store certificates corresponding to trusted entities.

Locating (220) a program signature and a certificate chain corresponding to a program of interest may include receiving a program with a signature and a certificate chain to be verified. In some embodiments, the program signature and certificate chain are provided either by a user or a computing system. In other embodiments, program information is retrieved and the program signature and certificate chain are extracted to be verified.

Determining (230) if the end-entity certificate is a code signing certificate may include analyzing the information within the end-entity certificate. In some embodiments, the end-entity certificate contains an extension labeled "Key Usage" that indicates the public key's intended purpose. In said embodiments, determining (230) if the end-entity certificate is a code signing certificate includes verifying that the "Key Usage" extension in the end-entity certificate is labeled code signing. If it is determined that the end-entity certificate is a code signing certificate (230, yes branch), then the method continues by determining (240) if the program signature is valid. If it is determined that the end-entity certificate is not a media signing certificate (230, no branch), then the method continues by failing (290) to validate the digital media.

Determining (240) if the program signature is valid may include verifying the program signature using a code signing public key. In one embodiment, determining (240) if the program signature is valid includes using a code signing public key found in the end-entity certificate to validate the program signature. If it is determined that the program signature is valid (240, yes branch), then the method continues by determining (250) if each non-self-signed certificate in the chain has a verified signature. If it is determined that the program signature is not valid (240, no branch), then the method continues by failing (290) to validate the digital media.

Determining (250) if each non-self-signed certificate in the chain has a verified signature may include using a parent certificate corresponding to each non-self-signed certificate to verify the signature. In some embodiments, the parent certificate is in the certificate chain, and its public key is used to verify the signature. In other embodiments, the parent certificate is not in the certificate chain and must first be located in the trusted root certificate store. Once found in the trusted root certificate store, the parent certificate's public key is used to verify the signature. In either case, the parent certificate is also checked to ensure it is intended to be a CA certificate. In some embodiments, the parent certificate contains an extension labeled "Basic Constraint". In said embodiments, the parent certificate is intended to be a CA certificate if the extension labeled "Basic Constraint" indicates "CA=TRUE". Additionally, the parent certificate may also contain an extension labeled "Key Usage". The parent certificate's "Key Usage" extension must indicate the certificate is intended for "Cert Signing". If the parent certificate meets all the aforementioned criteria, and the signature is verified using the public key from the parent certificate (250, yes branch), then the method continues by validating (280) the digital media. If the parent certificate does not meet any of the aforementioned criteria, or the signature is not verified (250, no branch), then the method continues by determining (260) if the method is being iterated for the first time.

Determining (260) if the method is being iterated for the first time may include determining what iteration of the signature verification method 200 is being executed. In some embodiments, the signature verification method 200 may be executed a second time after a modified signature validation method is executed. In these embodiments, there may be no benefit to executing the modified signature validation method again. Therefore, if it is determined it is not the first iteration of the method (260, no branch), then the method continues by failing (290) to validate the digital media. If it is determined that the method is being iterated for the first time, then the method continues by executing (270) a rekeyed signature verification method.

Executing (270) a rekeyed signature verification method may include performing a method capable of verifying signatures in the presence of a rekeyed certificate. In one embodiment, the rekeyed signature verification method corresponds to the method described with respect to FIG. 3.

Validating (280) the digital media may include indicating that the digital media has been deemed genuine. In some embodiments, validating the digital media includes issuing an indication of validity corresponding to the digital media to the user. In other embodiments, no indication may be necessary, and therefore a digital media signature going through the method without incident serves as indication of validity.

Failing (290) to validate the digital media may include indicating that the digital media has not been deemed genuine. In some embodiments, failing (290) to validate the digital media includes issuing an indication of failed validity corresponding to the digital media to the user. In other embodiments, no indication may be necessary, and therefore a digital media signature failing to reach the end of the method services as an indication that the digital media is not valid.

Figure 3:
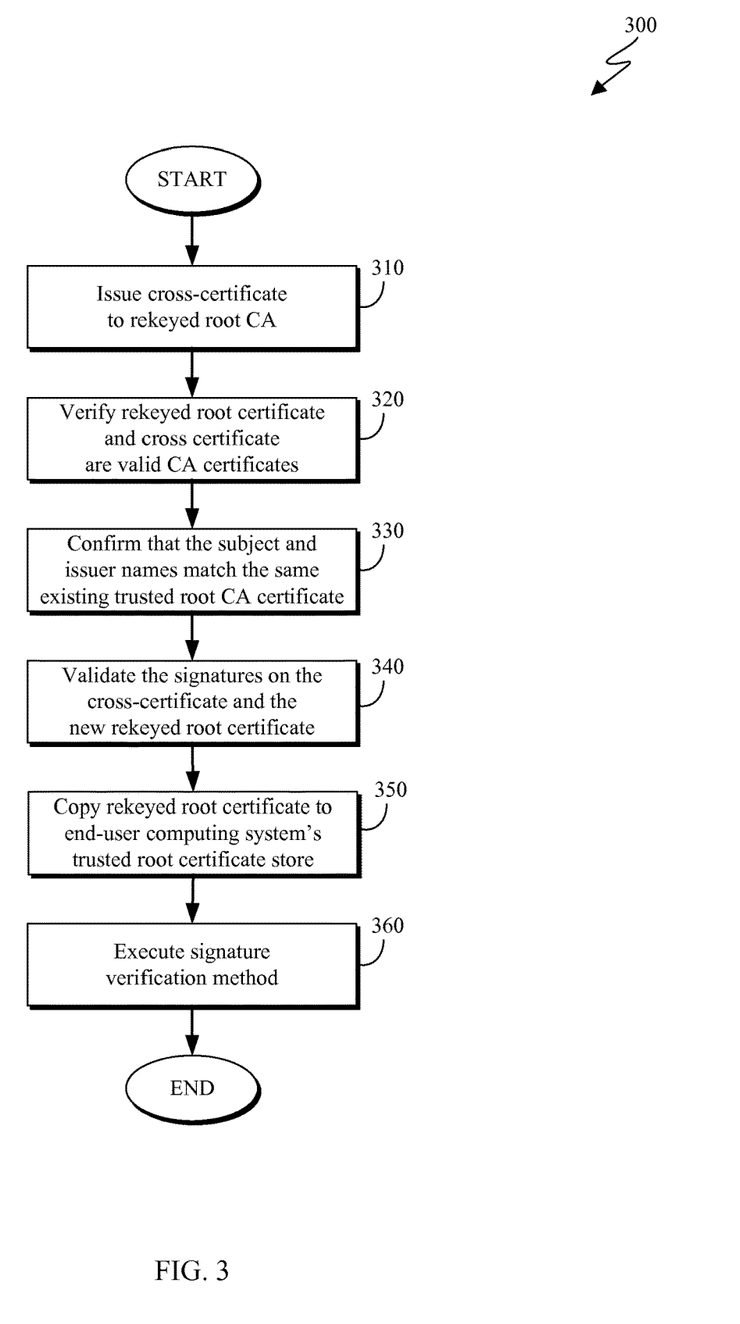
FIG. 3 is a flowchart depicting a rekeyed signature verification method in accordance with some embodiments of the present invention.

FIG. 3 is a flowchart depicting a rekeyed signature verification method 300 in accordance with some embodiments of the present invention. As depicted, rekeyed signature verification method 300 includes issuing (310) a cross-certificate to a rekeyed root CA, verifying (320) that the rekeyed root certificate and the cross certificate are valid CA certificates, confirming (330) that the subject and issuer names on the certificates match the same existing trusted root CA certificate, validating (340) the signatures on the cross-certificated and the rekeyed root certificate, copying (350) the rekeyed root certificate to an end-user computing system's trusted root certificate store, and executing (360) a signature verification method. Rekeyed signature verification method 300 may be used to determine whether or not a program is genuine when a root CA certificate has been rekeyed.

Issuing (310) a cross-certificate to a rekeyed root certificate may include certifying a rekeyed root certificate via the current root CA. When a root CA certificate approaches expiration, the CA needs to be rekeyed. A new key pair is generated, and a new self-signed root certificate is created. The subject and issuer names in the certificate remain the same as the expiring certificate. Issuing (310) a cross-certificate may include certifying the new certificate by using the old root CA to issue a cross-certificate to the rekeyed root certificate that is essentially a new public key signed by the old public key. The cross-certificate has the same names as the old and new root certificate. Additionally, the cross-certificate has the same Basic Constraints and Key Usage extensions as the root certificates, indicating that the cross-certificate is a certificate authority certificate and not a code signing certificate. In some embodiments, issuing (310) a cross-certificate to a rekeyed root certificate includes adding the rekeyed root certificate and the cross-certificate to the signed program during the signature process as additional certificates. In these embodiments, the rekeyed root certificate and the cross-certificate can be disseminated to any end-user computing system(s) with the signed program.

Verifying (320) the rekeyed root certificate and cross certificate are valid CA certificates may include confirming that the Basic Constraints and Key Usage extensions match those of the old root certificate. Since the old root certificate corresponds to an expiring certification authority, the Basic Constraints extension indicates "CA=TRUE" and the Key Usage extension indicates "Cert Signing". Therefore, both the rekeyed root certificate and cross-certificate's extensions should indicate the same. Additionally, verifying (320) the rekeyed root certificate and cross-certificate may include checking to see that neither certificate has expired. If either of these verifications fail, the method terminates.

Confirming (330) that subject and issuer names in the cross and rekeyed root certificates match the same existing trusted root CA certificate may include verifying that the subject and issuer names in the cross-certificate are the same as the subject and issuer names in the rekeyed root certificate. Confirming (330) the subject and issuer names may also include ensuring that the subject and issuer names in both certificates correspond to a trusted root CA certificate. With the insertion of the cross-certificate in the certificate chain, the rekeyed root certificate should now stem from the same old root CA certificate, otherwise the certificate chain will be unable to validate signatures. If either of these confirmations fail, the method terminates.

Validating (340) the signatures on the cross-certificate and the new rekeyed root certificate may include verifying the signature on the cross-certificate using the public key from the old trusted root CA certificate. Once the cross-certificate's signature has been validated, the signature on the rekeyed root certificate is validated using the public key from the cross-certificate. If either of these validations fail, the method terminates.

Copying (350) the rekeyed root certificate to an end-user computing system's trusted root certificate store may include adding the rekeyed root certificate to the trusted root certificate store. The preceding verifications 320-340 ensure that the new rekeyed root certificate is a legitimate rollover certificate from the original trusted root CA certificate. Adding the rekeyed root certificate to the trusted root certificate store implicitly completes the rollover process. Once the rekeyed root certificate has been added to the trusted root certificate store, it can be used to verify program signatures directly via signature verification method 200.

Executing (360) a signature verification method may include executing a method such as the one described with respect to FIG. 2. With the rekeyed root certificate in the trusted root certificate store, programs signed with respect to the rekeyed root certificate that were previously unverified can be validated using signature verification method 200.

Figure 4A:
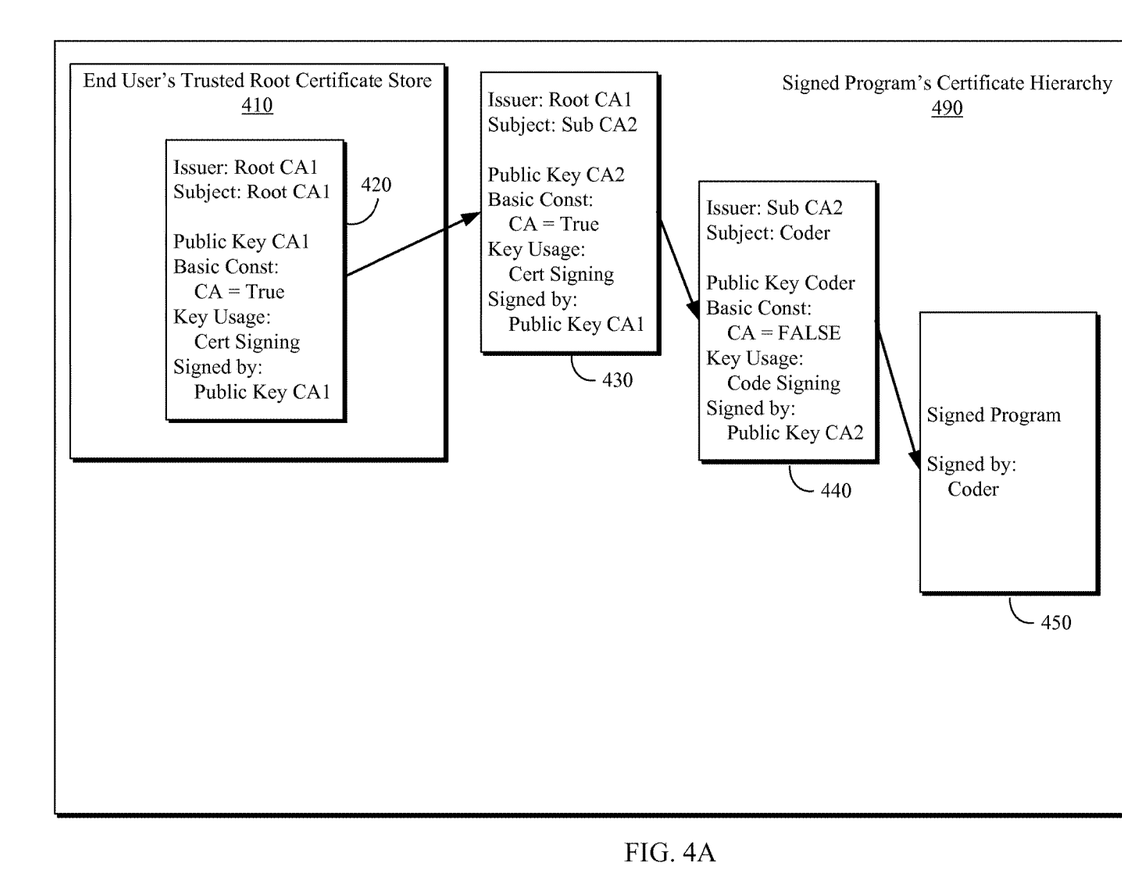
FIG. 4A is a dataflow diagram depicting an example of a signed program's certificate hierarchy in accordance with one embodiment of the present invention.

FIG. 4A is a dataflow diagram depicting an example of a signed program's certificate hierarchy 490 in accordance with one embodiment of the present invention. As depicted, the signed program's certificate hierarchy 490 includes an end user's trusted root certificate store 410, a trusted root CA certificate 420, a subordinate certificate 430, an end-entity certificate 440, and a program signature 450. In the depicted example, program signature 450 can be validated using signature verification method 200 because all the certificates in its certificate chain meet the requirements as checked by the method. The scenario depicted in FIG. 4A may correspond to a program signature being verified using an original trusted root CA certificate 420.

Figure 4B:
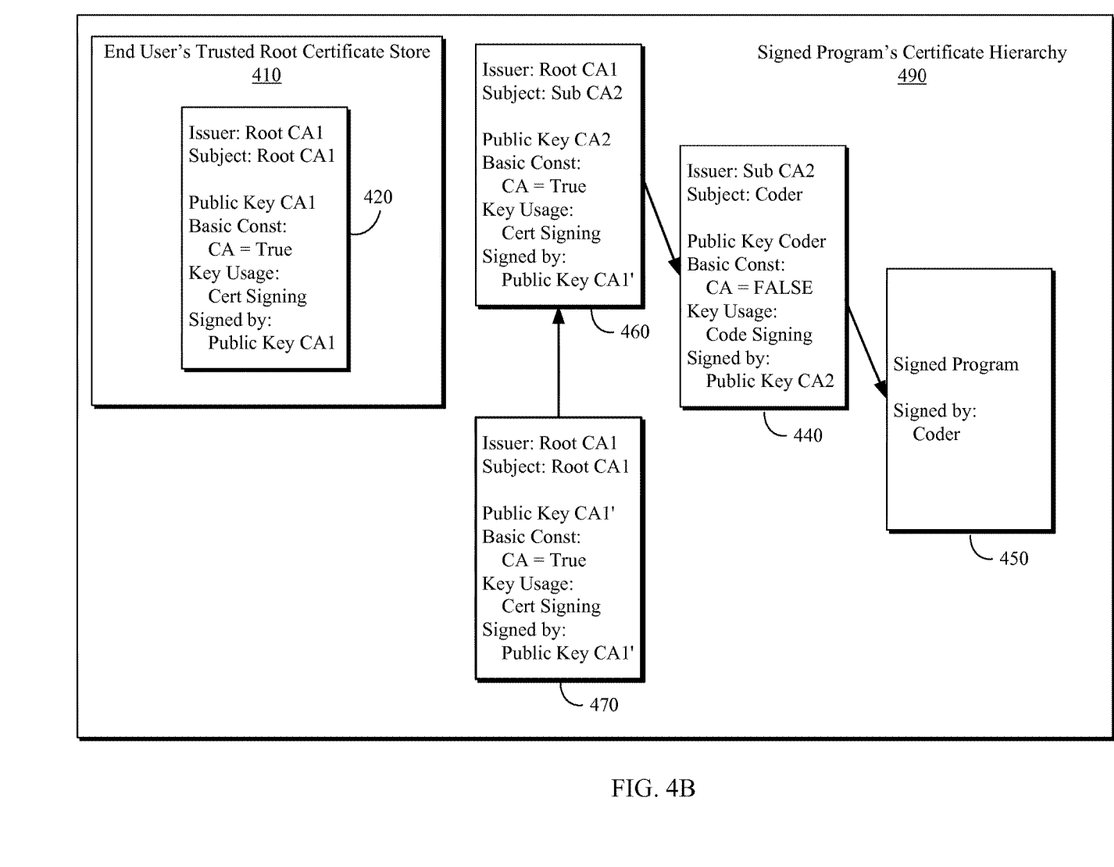
FIG. 4B is a dataflow diagram depicting an example of a signed program's certificate hierarchy after root rekey in accordance with one embodiment of the present invention.

FIG. 4B is a dataflow diagram depicting an example of a signed program's certificate hierarchy 490 after root rekey in accordance with one embodiment of the present invention. As depicted, the signed program's certificate hierarchy 490 after root rekey includes an end user's trusted root certificate store 410, a trusted root CA certificate 420, a new self-signed root certificate 470, a recertified subordinate certificate 460, an end-entity certificate 440, and a program signature 450. The scenario depicted in FIG. 4B may correspond to a program signature that cannot be validated using a signature verification method, such as signature verification method 200 depicted in FIG. 2, alone. The certificate chain stems from a new self-signed root certificate 470 that is not part of the end user's trusted root certificate store 410. Consequentially, the program signature cannot be verified using only a method such as the signature verification method depicted in FIG. 2.

Figure 4C:
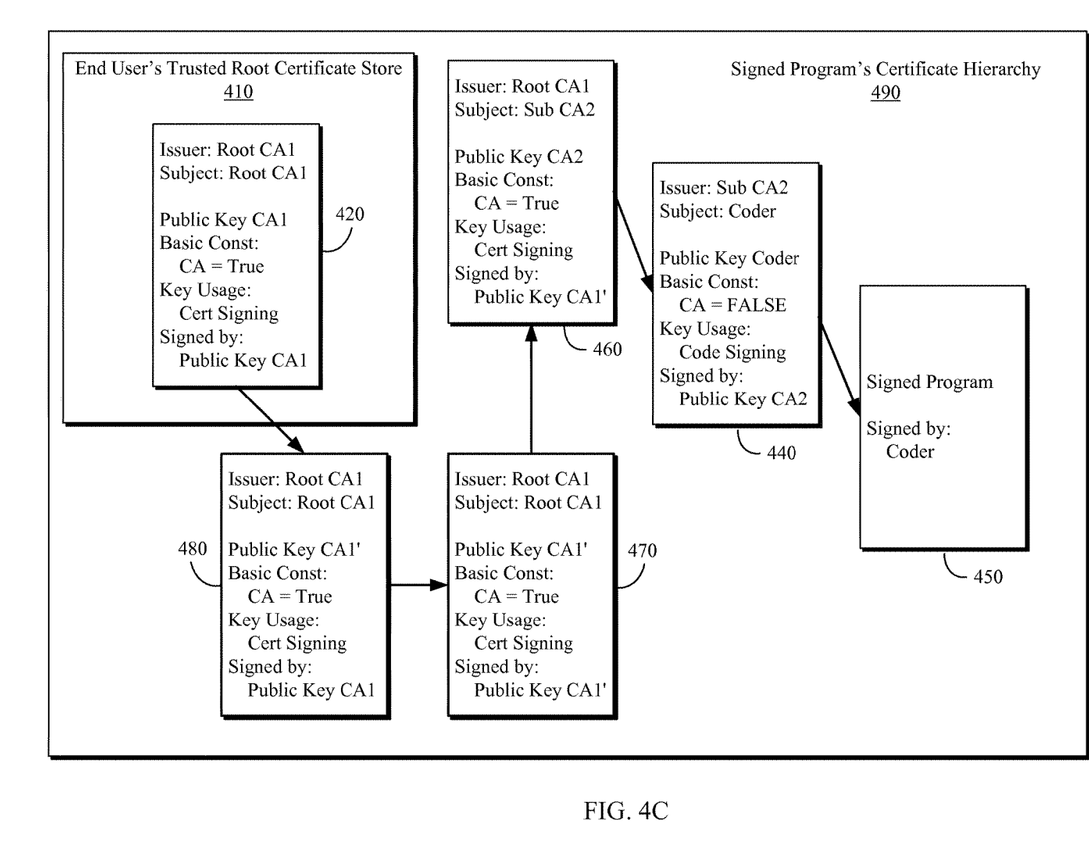
FIG. 4C is a dataflow diagram depicting a signed program's certificate hierarchy with rollover certificates in accordance with one embodiment of the present invention.

FIG. 4C is a dataflow diagram depicting a signed program's certificate hierarchy 490 with rollover certificates in accordance with one embodiment of the present invention. As depicted, the signed program's certificate hierarchy 490 with rollover certificates includes an end user's trusted root certificate store 410, a trusted root CA certificate 420, a cross-certificate 480, a new self-signed root certificate 470, a recertified subordinate certificate 460, an end-entity certificate 440, and a program signature 450. The scenario depicted in FIG. 4C may correspond to a program signature being validated using a new self-signed root certificate 470. As is the case in FIG. 4B, the certificate chain depicted in FIG. 4C stems from a new self-signed root certificate 470 that is not a part of the trusted root certificate store 410. To prevent the signature validation from failing again, trusted root CA certificate 420 issues a cross-certificate 480 that then certifies self-signed root certificate 470 as trusted. By doing so, the certificate chain now begins with a trusted root CA certificate 420 contained in the trusted root certificate store 410, and the signed program 450 is therefore verified.

Figure 4D:
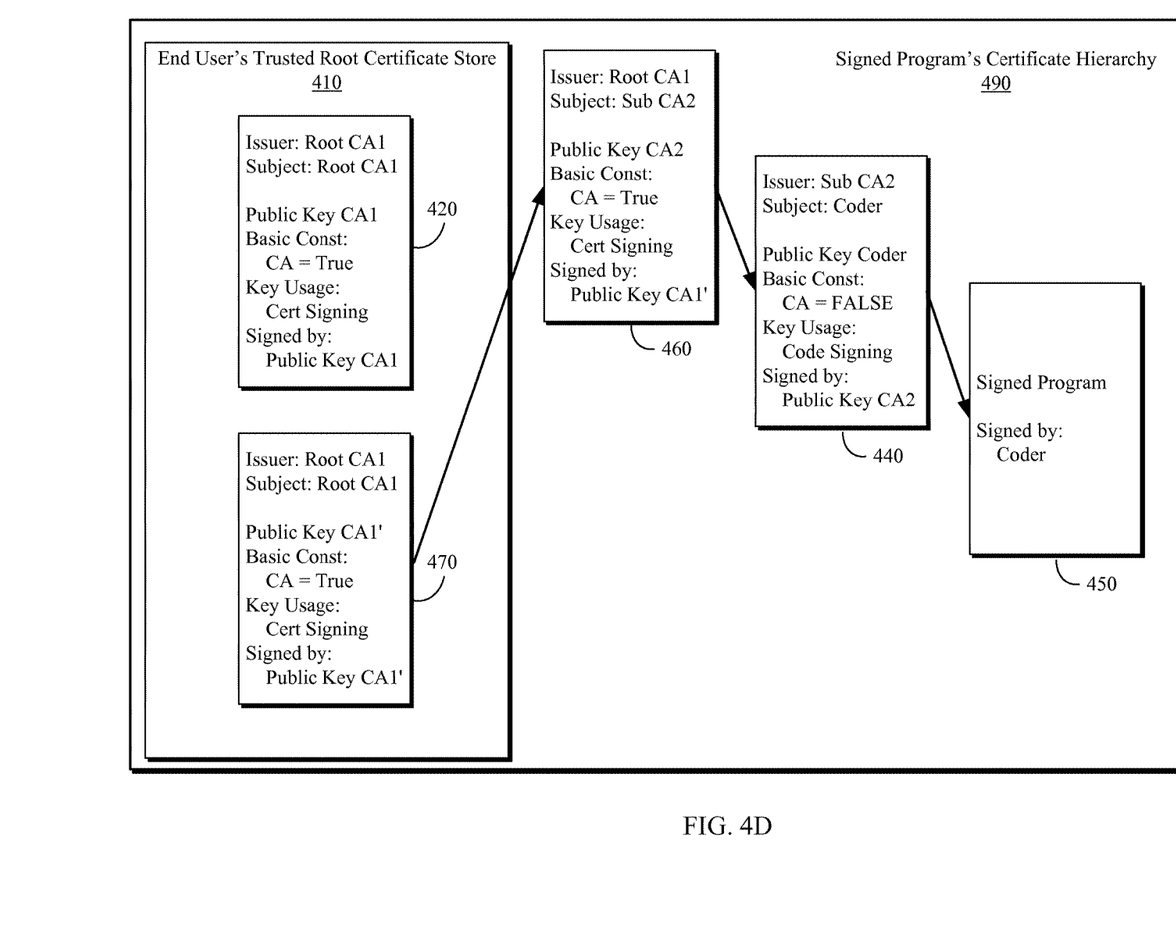
FIG. 4D is a dataflow diagram depicting a signed program's certificate hierarchy after rollover is completed in accordance with one embodiment of the present invention.

FIG. 4D is a dataflow diagram depicting a signed program's certificate hierarchy 490 after rollover is completed in accordance with one embodiment of the present invention. As depicted, the signed program's certificate hierarchy 490 after rollover includes an end user's trusted root certificate store 410, a trusted root CA certificate 420, a new self-signed root certificate 470, a recertified subordinate certificate 460, an end-entity certificate 440, and a program signature 450. The scenario depicted in FIG. 4D may correspond to a signed program's certificate hierarchy after a rollover signature verification method such as rollover signature verification method 300 depicted in FIG. 3 has been executed. As depicted, new self-signed root certificate 470 has been moved into the end user's trusted root certificate store 410 following its successful cross-certification as depicted in FIG. 4C. As is described with respect to FIG. 3, once new self-signed root certificate 470 successfully validates a program signature, it is moved to the end user's trusted root certificate store 410. Once new self-signed root certificate 470 has been moved to the end user's trusted root certificate store 410, certificate chains stemming from new self-signed root certificate 470 can be validated using a signature verification method without additionally executing a rollover signature verification method, as depicted in FIG. 4D.

Figure 5:
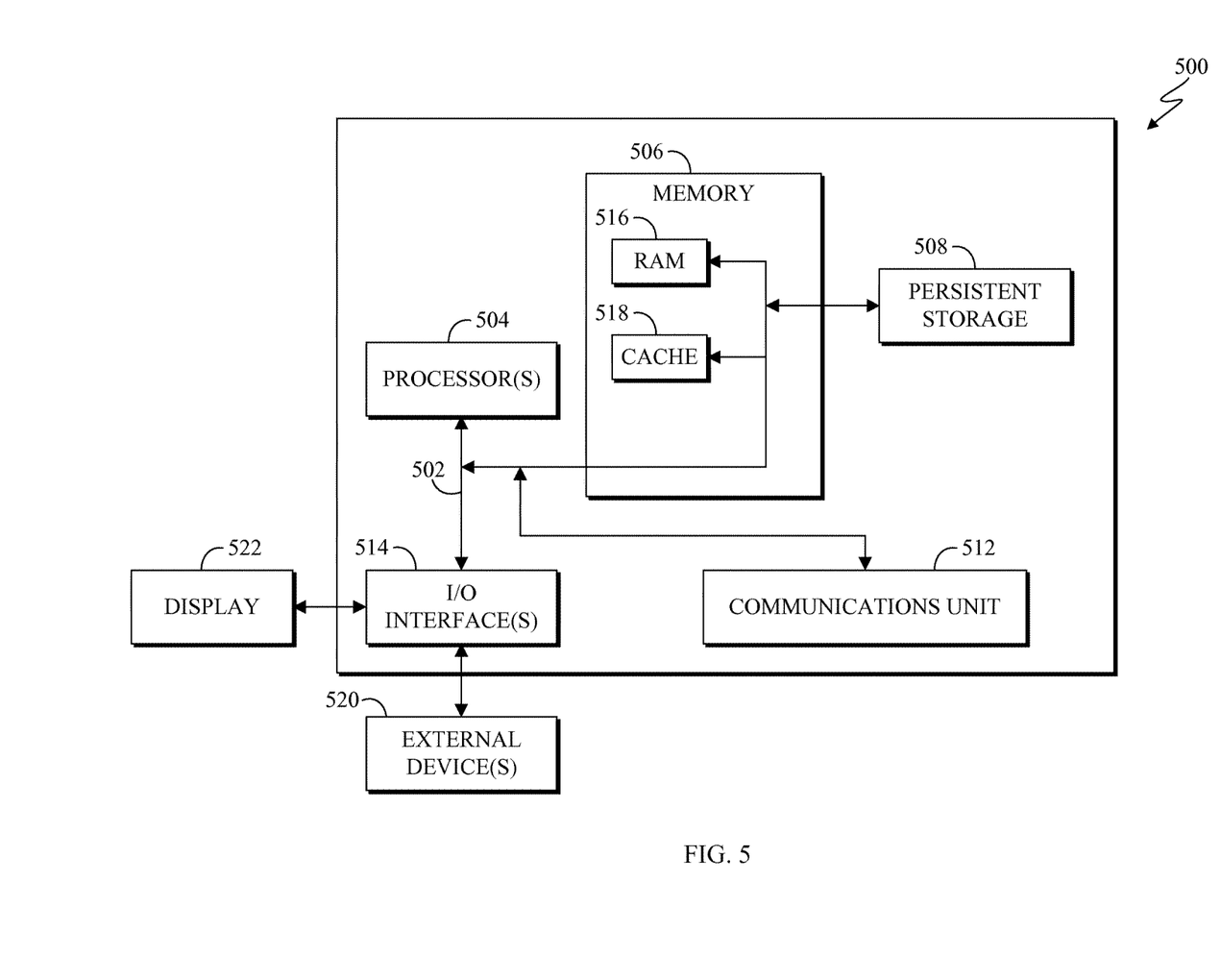
FIG. 5 depicts a block diagram of components of a computer, in accordance with some embodiments of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for validating digital media signatures, the method comprising:
    adding current root certificates for certification authorities to be trusted to a trusted root certificate store;
    using a certification authority's public key to issue a cross-certificate to a rekeyed root certificate by signing the rekeyed root certificate's public key with the certification authority's public key, wherein the rekeyed root certificate has the same subject and issuer names as an original trusted certificate of the certification authority;
    validating the cross-certificate and the rekeyed root certificate with respect to an original trusted root certificate by verifying that a key usage extension and a basic constraints extension for each the cross-certificate and the rekeyed root certificate match a key usage extension and a basic constraints extension for the original trusted root certificate;
    adding the rekeyed root certificate to an end user's trusted root certificate store; and
    validating a digital media signature using the cross-certificate and the end user's trusted root certificate store.

2. The method of claim 1, wherein validating the cross-certificate and the rekeyed root certificate with respect to an original trusted root certificate comprises verifying a subject name and an issuer name for each the cross-certificate and the rekeyed root certificate match a subject name and an issuer name for the original trusted root certificate.

3. The method of claim 1, wherein validating the cross-certificate and the rekeyed root certificate with respect to an original trusted root certificate comprises verifying that the cross-certificate and the rekeyed root certificate have not expired.

4. The method of claim 1, wherein validating a digital media signature using the cross-certificate and the rekeyed root certificate comprises using a public key from the rekeyed root certificate to initiate validation of the digital media signature.

5. The method of claim 1, wherein the digital media signature corresponds to a program signature.

6. A computer program product for validating digital media signatures, the computer program product comprising:
    one or more computer readable storage media that are not transitory signals per se and program instructions stored on the one or more computer readable storage media, the program instructions comprising instructions to:
    add current root certificates for certification authorities to be trusted to a trusted root certificate store;
    use a certification authority's public key to issue a cross-certificate to a rekeyed root certificate by signing the rekeyed root certificate's public key with the certification authority's public key, wherein the rekeyed root certificate has the same subject and issuer names as an original trusted certificate of the certification authority;
    validate the cross-certificate and the rekeyed root certificate with respect to an original trusted root certificate by verifying that a key usage extension and a basic constraints extension for each the cross-certificate and the rekeyed root certificate match a key usage extension and a basic constraints extension for the original trusted root certificate;
    add the rekeyed root certificate to an end user's trusted root certificate store; and
    validate a digital media signature using the cross-certificate and the end user's trusted root certificate store.

7. The computer program product of claim 6, wherein instructions to validate the cross-certificate and the rekeyed root certificate with respect to an original trusted root certificate comprise instructions to:
    verify a subject name and an issuer name for each the cross-certificate and the rekeyed root certificate match a subject name and an issuer name for the original trusted root certificate.

8. The computer program product of claim 6, wherein instructions to validate the cross-certificate and the rekeyed root certificate with respect to an original trusted root certificate comprise instructions to:
    verify that the cross-certificate and the rekeyed root certificate have not expired.

9. The computer program product of claim 6, wherein instructions to validate a digital media signature using the cross-certificate and the rekeyed root certificate comprise instructions to:
    use a public key from the rekeyed root certificate to initiate validation of the digital media signature.

10. The computer program product of claim 6, wherein the digital media signature corresponds to a program signature.

11. A computer system for validating digital media signatures, the computer program product comprising:
    one or more hardware processors;
    one or more computer-readable storage media that are not transitory signals per se;
    program instructions stored on the computer-readable storage media for execution by at least one of the one or more processors, the program instructions comprising instructions to:
    add current root certificates for certification authorities to be trusted to a trusted root certificate store;
    use a certification authority's public key to issue a cross-certificate to a rekeyed root certificate by signing the rekeyed root certificate's public key with the certification authority's public key, wherein the rekeyed root certificate has the same subject and issuer names as an original trusted certificate of the certification authority;
    validate the cross-certificate and the rekeyed root certificate with respect to an original trusted root certificate by verifying that a key usage extension and a basic constraints extension for each the cross-certificate and the rekeyed root certificate match a key usage extension and a basic constraints extension for the original trusted root certificate;

add the rekeyed root certificate to an end user's trusted root certificate store; and validate a digital media signature using the cross-certificate and the end user's trusted root certificate store.

12. The computer system of claim 11, wherein instructions to validate the cross-certificate and the rekeyed root certificate with respect to an original trusted root certificate comprise instructions to:

verify a subject name and an issuer name for each the cross-certificate and the identified rekeyed root certificate match a subject name and an issuer name for the original trusted root certificate.

13. The computer system of claim 11, wherein instructions to validate the cross-certificate and the rekeyed root certificate with respect to an original trusted root certificate comprise instructions to:

verify that the cross-certificate and the rekeyed root certificate have not expired.

14. The computer system of claim 11, wherein instructions to validate a digital media signature using the cross-certificate and the rekeyed root certificate comprise instructions to:

use a public key from the rekeyed root certificate to initiate validation of the digital media signature.

* * * * *